United States Patent
Ng et al.

(10) Patent No.: US 7,513,671 B2
(45) Date of Patent: Apr. 7, 2009

(54) EFFICIENT SOLID STATE LIGHT SOURCE FOR GENERATING LIGHT IN A LIMITED REGION OF THE COLOR SPACE

(75) Inventors: Yean Loon Ng, Perak (MY); Sumio Shimonishi, Inagi (JP); Eit Thian Yap, Penang (MY); Boon Keat Tan, Gelugor Penang (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 277 days.

(21) Appl. No.: 11/523,409

(22) Filed: Sep. 18, 2006

(65) Prior Publication Data

US 2008/0068859 A1    Mar. 20, 2008

(51) Int. Cl.
*F21V 33/00* (2006.01)

(52) U.S. Cl. ............... 362/612; 362/613; 362/800; 362/235; 362/231

(58) Field of Classification Search ............ 362/612, 362/613, 600, 602, 611, 555, 234, 235, 230, 362/231
See application file for complete search history.

(56) References Cited

U.S. PATENT DOCUMENTS

| | | | |
|---|---|---|---|
| 6,495,964 B1 * | 12/2002 | Muthu et al. | 315/149 |
| 6,536,914 B2 * | 3/2003 | Hoelen et al. | 362/231 |
| 7,256,557 B2 | 8/2007 | Lim et al. | |
| 2002/0051356 A1 * | 5/2002 | Takahashi et al. | 362/31 |
| 2005/0127381 A1 | 6/2005 | Vitta | |
| 2005/0134202 A1 * | 6/2005 | Lim et al. | 315/312 |
| 2005/0156103 A1 * | 7/2005 | May et al. | 250/228 |
| 2006/0049782 A1 * | 3/2006 | Vornsand et al. | 315/312 |

FOREIGN PATENT DOCUMENTS

DE     102005001685     9/2005

* cited by examiner

Primary Examiner—Laura Tso

(57) ABSTRACT

A light source having first and second component light sources, a mixing device, and a controller is disclosed. The first component light source generates light having a perceived color that can be varied within a predetermined two-dimensional region of the CIE 1976 color space in response to a set of color control signals. The second component light source generates white light. The mixing device combines light from the first and second component light sources to produce an output light signal having a perceived output color. The controller generates the set of color control signals in response to an input signal from a source external to the light source, the controller maintaining the perceived output color at a point in the CIE 1976 color space determined by the input signal.

13 Claims, 5 Drawing Sheets

EFFICIENT SOLID STATE LIGHT SOURCE FOR GENERATING LIGHT IN A LIMITED REGION OF THE COLOR SPACE

BACKGROUND OF THE INVENTION

Light-emitting diodes (LEDs) are attractive replacement candidates for conventional light sources based on incandescent bulbs and fluorescent light tubes. LEDs have higher energy conversion efficiency than incandescent lights and substantially longer lifetimes than both incandescent and fluorescent light fixtures. In addition, LED-based light fixtures do not require the high voltages associated with fluorescent lights.

Unfortunately, LEDs have a number of disadvantages that inhibit their widespread acceptance as a replacement for the above-described conventional light sources. First, LEDs having outputs equivalent to that of a large conventional light source are not commercially available; hence, high power LED sources require that a large number of individual LEDs be combined to provide the desired output.

Second, LEDs emit light in narrow optical bands. Hence, to provide a light source that a human observer will perceive as having a particular color, LEDs having different emission spectra must be combined into the same light source or phosphor conversion layers must be utilized to convert some of the LED generated light to light of a different spectrum. For example, an LED that is perceived to emit white light can be constructed by combining the output of LEDs having emission spectra in the red, blue, and green region of the spectrum or by utilizing a blue emitting LED and a layer of phosphor that converts some of the output light to light in the yellow region of the spectrum.

The first approach requires three types of LEDs that generate light at essentially the same maximum intensity if the output light is to be perceived as having any color within a wide range of colors. The cost of providing LEDs in certain color bands is substantially higher than that associated with LEDs in other color bands. As a result, the cost of the light source is dominated by the cost of the LED type having the highest cost.

Phosphor conversion can provide a solution to this problem if the light source is to provide a single color of light. For example, as noted above, a white light source can be provided by covering a blue LED with a layer of phosphor that converts some of the blue light to yellow light. If the fraction of the light converted is correctly chosen, a human observer will perceive the light as being white. The cost of such a light source is dominated by the cost of the blue LED. Cost efficient white light sources of this type are now being sold; however, these sources only generate white light of one "color temperature".

For many applications, the ability to control the color temperature of the light source, or otherwise vary the output color in a narrow range about that provided by the white light source is required. For example, physicians often view x-rays with the aid of a backlit display constructed from a light box that contains a white light source that uniformly illuminates one surface of the box on which the x-ray is placed. Two different color light sources are used in conjunction with these displays, the particular color being determined by the particular type of x-ray being displayed.

Prior art light boxes utilize fluorescent light tubes as the light source. Since fluorescent lights do not provide changeable color points, the user is required to maintain two different viewing light boxes. This arrangement substantially increases the costs of the viewing boxes, which are typically located in a number of different examining rooms in the physician's office. In addition, the second box uses a significant amount of the wall space in the examining room.

SUMMARY OF THE INVENTION

The present invention includes a light source having first and second component light sources, a mixing device, and a controller. The first component light source generates light having a perceived color that can be varied within a predetermined two-dimensional region of the CIE 1976 color space in response to a set of color control signals. The second component light source generates white light. The mixing device combines light from the first and second component light sources to produce an output light signal having a perceived output color. The controller generates the set of color control signals in response to an input signal from a source external to the light source, the controller maintaining the perceived color output at a point in the CIE 1976 color space determined by the input signal. The second component light source can be constructed from an LED that emits light in the blue and yellow spectral regions. The first component light source could include first, second, and third groups of LEDs, each group including a plurality of LEDs that emit light in a corresponding spectral region.

DETAILED DESCRIPTION OF THE PREFERRED EMBODIMENTS OF THE INVENTION

Figure 1:
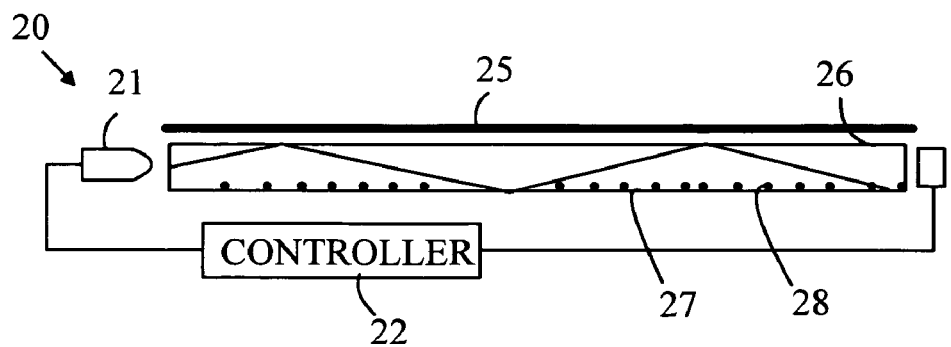
FIG. 1 is a side view of viewing station 20.
Figure 2:
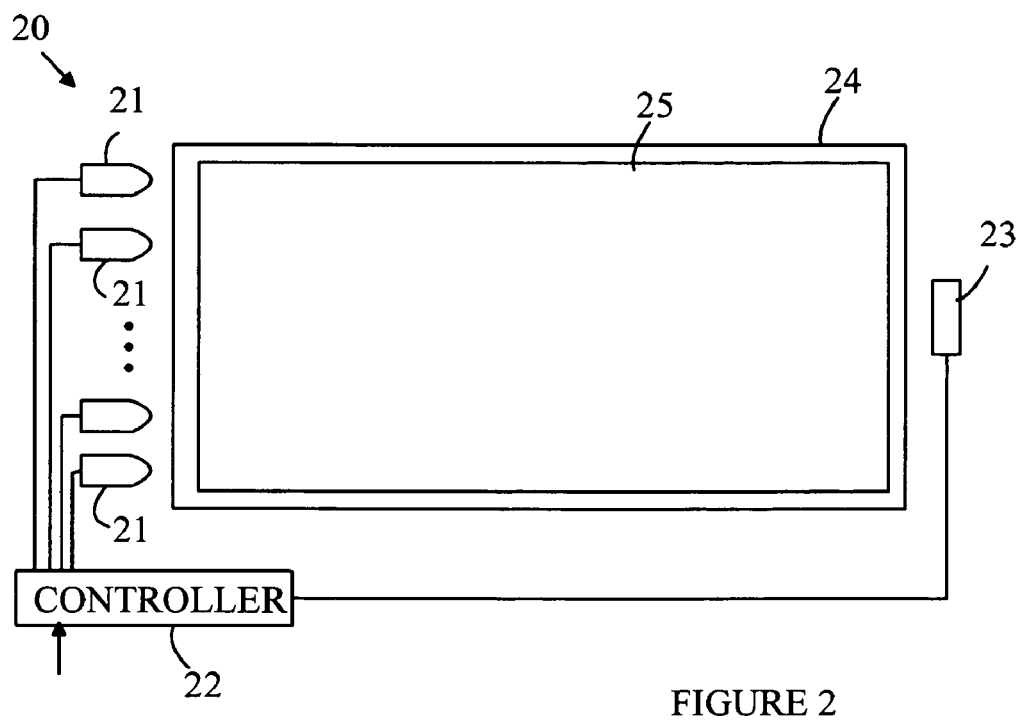
FIG. 2 is a top view of viewing station 20.

The present invention can be more easily understood with reference to a light source designed to display x-rays at one of two different color settings. Refer now to FIGS. 1 and 2, which illustrate a viewing station 20 for viewing x-ray films 25 with either of two light settings. FIG. 1 is a side view of viewing station 20, and FIG. 2 is a top view of viewing station 20. Viewing station 20 includes a light box 24 that is illuminated by light from a plurality of LEDs 21. The set of LEDs can be viewed as a plurality of groups of LEDs, in which each group emits light having a different output spectrum than the other groups. In addition, the set of LEDs include a plurality of LEDs that emit light at the spectrum that is characteristic of each group. The light from the LEDs is input into light box 24 at an angle such that the light will be trapped by internal reflection. The top surface of light box 24 is transparent. The bottom surface 27 is reflective and includes scattering centers 28 that reflect part of the light at angles such that the light strikes the upper surface 26 at angles less than the critical angle. The light leaves light box 24 through the upper surface and illuminates the x-ray film. The scattering centers are distributed such that the upper surface of light box 24 is uniformly illuminated. It should be noted that the upper surface of light box 24 can include scattering centers as well.

In one embodiment of the present invention, light box 24 is a solid sheet of clear plastic. The scattering centers on the bottom surface are formed by etching or otherwise roughening the surface of the plastic. It should be noted that embodiments in which the upper surface of light box 24 is roughened could also be constructed. In such embodiments, the bottom surface can remain smooth and be covered with a reflective coating.

The color of the light in the light box is sampled by a detector 23 that measures the intensity of the light in light box 24 at each of the spectra. Detector 23 can be constructed from a plurality of photodetectors. Each photodetector can include a different bandpass filter. Controller 22 processes the signals from the various photodetectors to determine the intensity of light that is present in the light box in each of the spectral regions. In one embodiment, detector 23 measures the light in the light box in the red, blue, and green regions of the spectrum.

Controller 22 adjusts the drive signals to each of the LEDs to assure that the light in the light box is at a predetermined color point in the CIE 1976 space. In particular, controller 22 adjusts the light to match one of a plurality of predetermined colors. The particular color is specified by the user via input signals to controller 22. For example, controller 22 can include a manual switch having a plurality of positions, each position corresponding to one of the predetermined colors. The switch is read by the data processor in controller 22.

Figure 3:
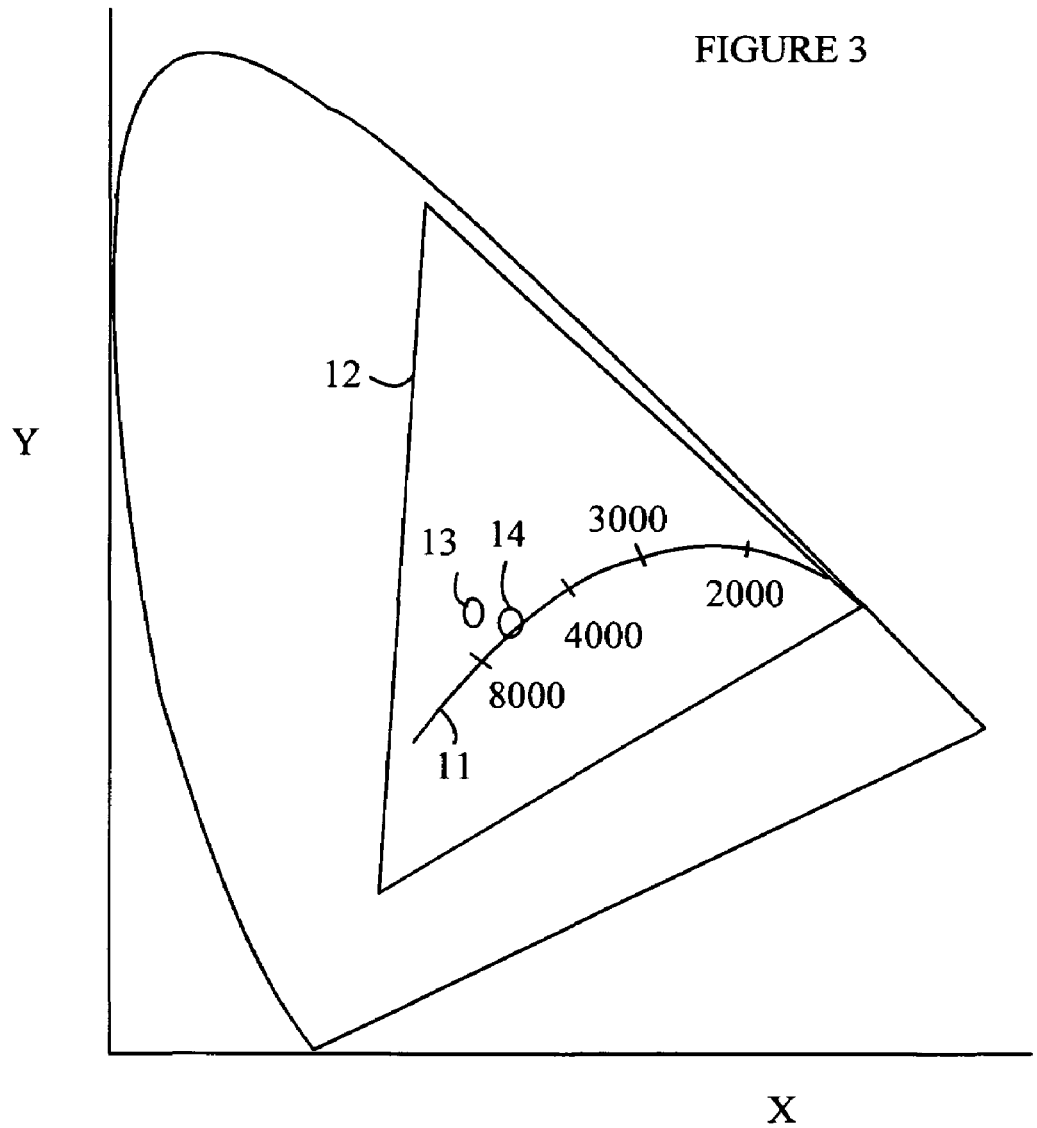
FIG. 3 illustrates curve 11 in the CIE 1976 color space corresponding to a white incandescent light source at various color temperatures.

In one embodiment, controller 22 provides illumination corresponding to one of the two standard color points used to view x-ray film. Refer now to FIG. 3, which illustrates curve 11 in the CIE 1976 color space corresponding to a white incandescent light source at various color temperatures. The points shown at 13 and 14 correspond to the colors used to display x-rays, namely, P45(x=0.255, y=0.3100) and P104 (x=0.280 and y=0.304). The area shown at 12 is the area that can be reached by adjusting the ratios of the intensities of three commercially available red, green, and blue LEDs.

It should be noted that the area 12 over which the color can be varied is much larger than needed to provide a light source that switches between points 13 and 14. As noted above, this additional variability comes at a significant price, since it requires that all of the LEDs generate light at relatively high intensities. LEDs that provide light in different spectral ranges have significantly different power conversion efficiencies and costs. For example, LEDs in the green region of the spectrum are significantly more expensive than LEDs in the red portion of the spectrum. In addition, the red emitting LEDs have higher light conversion efficiencies.

One embodiment of the present invention is based on the observation that a compound light source constructed from a white LED light source and a RGB light source of substantially lower power output can provide a light source having a variable color in a restricted region of the color space that is sufficient to encompass the desired color points at a price that is substantially less than that needed to provide a source utilizing only a RGB LED light source of the desired output power.

White LED sources are particularly attractive in this regard, since these LEDs are now being manufactured in large quantities as replacements for bulbs in flash lights and the like. In one type of white LED, a blue LED is covered with a phosphor layer that converts part of the blue light to yellow light. The combination of the remaining blue light and the yellow light from the phosphor appears to be white.

It should also be noted that these white LEDs have higher light conversion efficiency per watt than fluorescent light sources. A typical fluorescent light source used to illuminate LCD displays has a conversion efficiency of about 167 Nits/W. A conventional RGB LED display has a conversion efficiency of 110 Nits/W. The white LEDs discussed above have a light conversion efficiency of 200 Nits/W. Hence, the combination of a white LED source and a conventional RGB source can provide a light source with a conversion efficiency very close to that of a fluorescent light source and still provide a significant amount of color variation.

Figure 4:
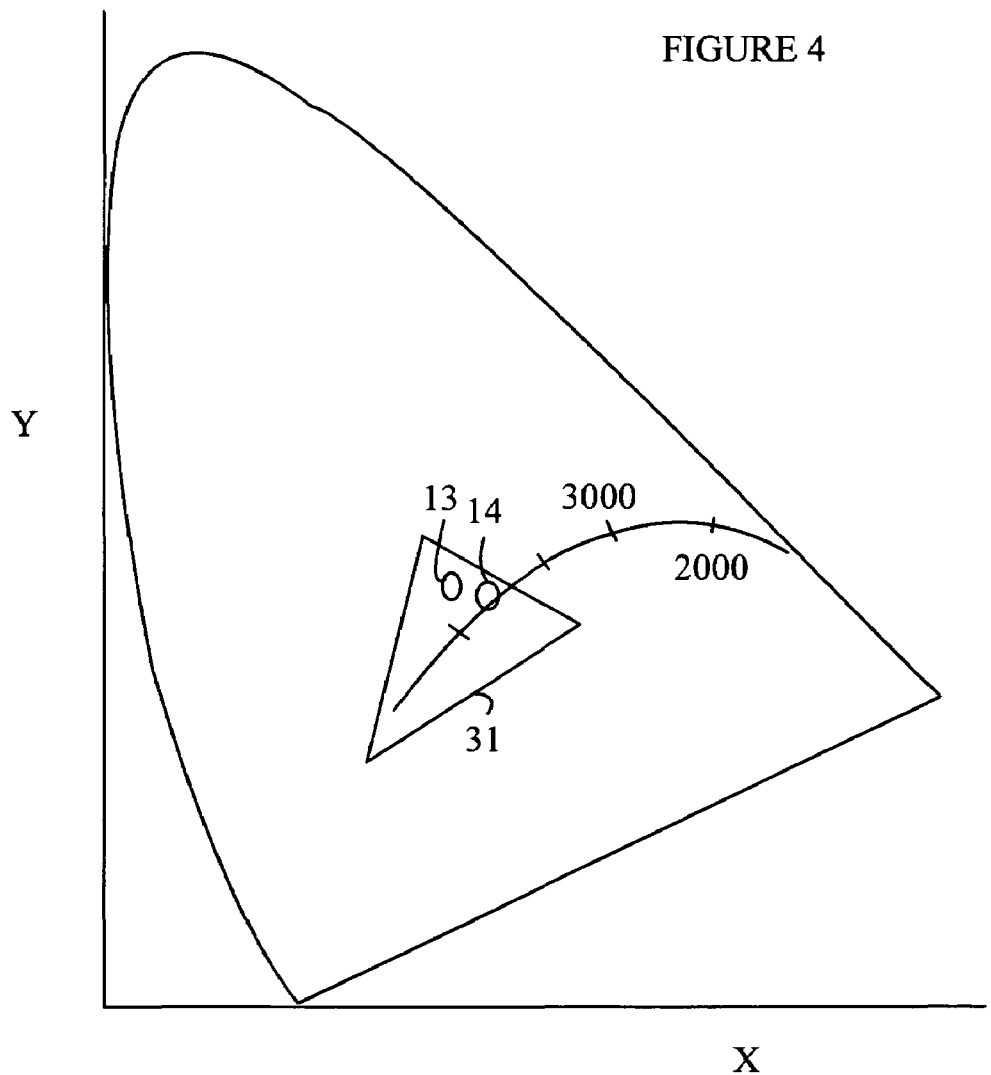
FIG. 4 illustrates the region of the color space that can be reached with a light source constructed from white LEDs and a conventional RGB light source having an output intensity approximately equal to that of the white LED source.

Refer now to FIG. 4, which illustrates the region of the color space that can be reached with a light source constructed from white LEDs and a conventional RGB light source having an output intensity approximately equal to that of the white LED source. The region over which the perceived color of the source can be varied by varying the intensities of the RGB LEDs is shown at 31. This region is still sufficient to incorporate the two x-ray viewing colors while requiring significantly less power in the RGB LEDs, since RGB LEDs provide, at most, only half of the total light from the source.

Controllers for varying the intensities of the LEDs in RGB light sources in response to detector signals generated by a detector that measures the relative intensity of the light source in the red, blue, and green spectral regions are mass produced, and hence, available at attractive prices. Hence, it would be advantageous to utilize such a commercial controller in the construction of a light source according to the present invention.

Figure 5:
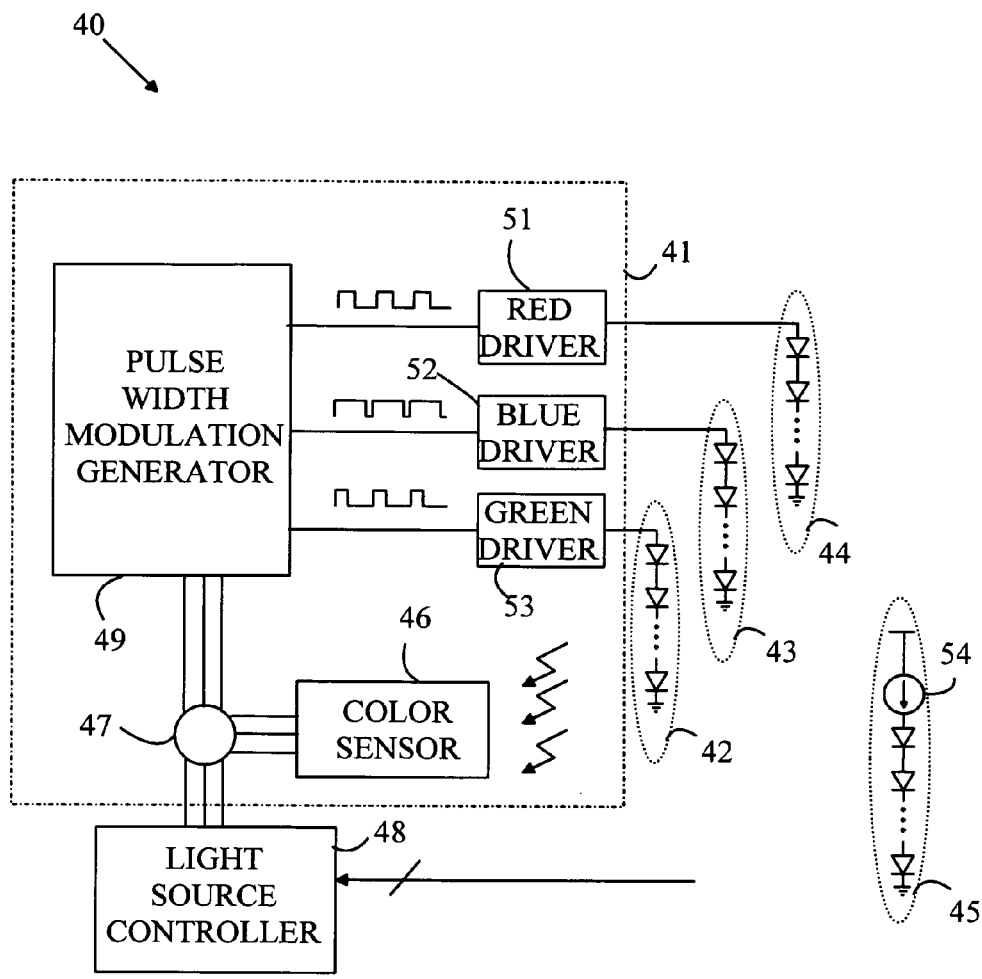
FIG. 5 illustrates one embodiment of a light source that utilizes a conventional RGB controller according to the present invention.

Refer to FIG. 5, which illustrates one embodiment of a light source according to the present invention that utilizes a conventional RGB controller. Light source 40 includes four sets of LEDs. The white set of LEDs shown at 45 operates at a preset current. The red, blue, and green sets of LEDs shown at 42-44, respectively, are controlled by a color controller 41. Color controller 41 includes a color sensor 46 that measures the light generated by all four sets of LEDs. Color sensor 46 is placed at a location at which the light from the various LEDs has had an opportunity to mix.

Color sensor 46 generates signals indicative of the intensity of light received by color sensor 46 in the optical bands around red, blue, and green. Color sensor 46 could be constructed from a set of three photodiodes in which each photodiode has a corresponding bandpass filter that limits the light reaching that photodiode to light in one of the optical bands in question. However, many other forms of color sensor are known to the art and could be utilized.

The outputs of color sensor 46 are compared to target color values that are generated off of the chip that contains color controller 41. In light source 40, these signals are stored in a light source controller 48 and selected by input from the user. The user input can include both a color point and intensity value. The color point can be selected by specifying one of a predetermined set of preprogrammed color points.

Comparator 47 outputs error signals that are utilized to adjust the average current through LED sets 42-44 utilizing pulse width modulation generator 49. The LEDs are turned on and off at a rate that is too fast for the human eye to perceive. The observer sees only the average light generated by the LEDs. The average current through the LEDs is set by setting the percentage of the time in each cycle that the LEDs are on. Pulse width modulation generator 49 adjusts the duty factor for each set of LEDs to minimize the error signals. A set of current drivers 51-53 provides the current to each set of LEDs.

While light source 40 makes efficient use of the conventional LED color controller 41, it still requires a separate current source to drive the white LEDs. This current source is not variable, and hence, the intensity of light at each particular color setting is not variable. Alternatively, current source 54 could be a variable current source with a separate intensity control that is operated by light source controller 48. However, such an arrangement is more costly.

Figure 6:
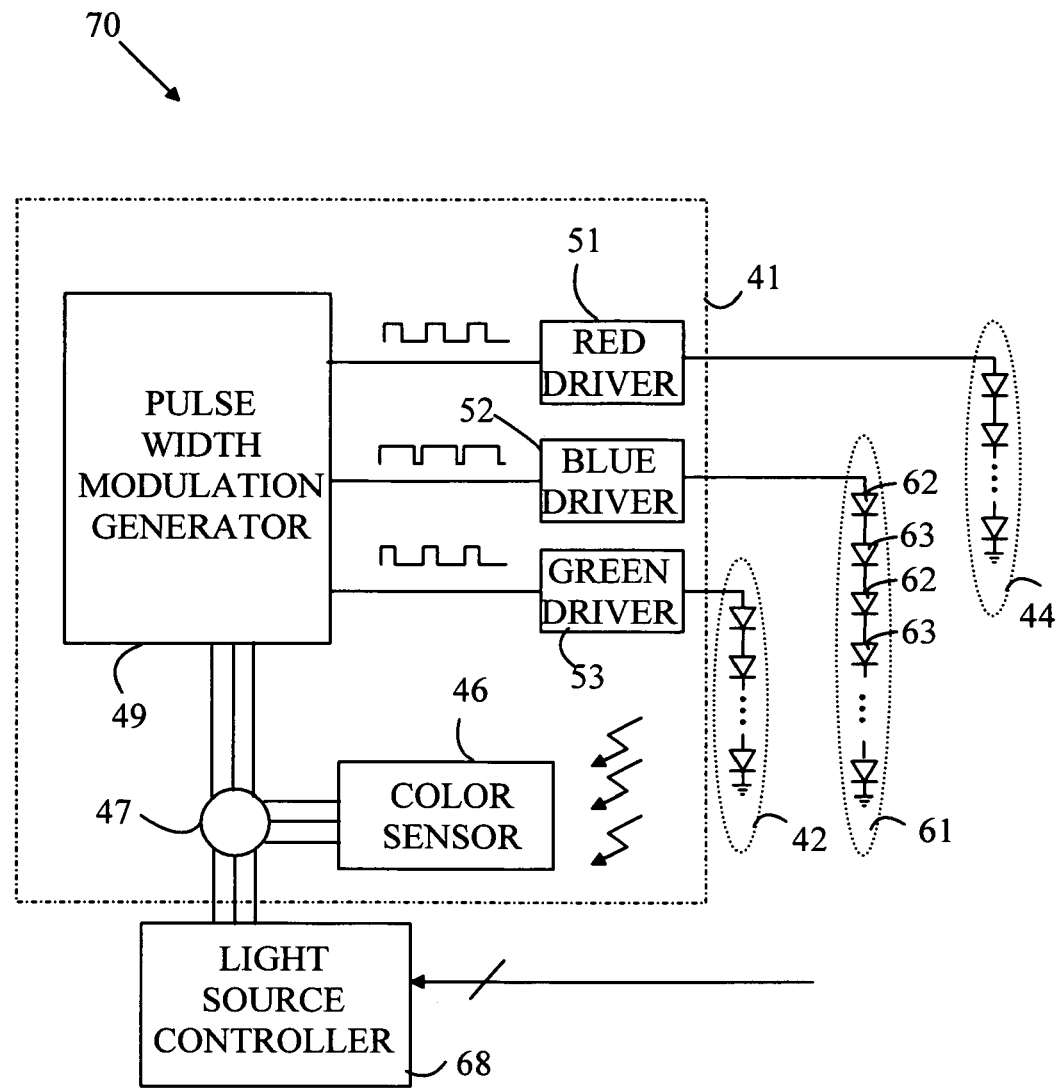
FIG. 6 illustrates another embodiment of a light source according to the present invention.

Refer now to FIG. 6, which illustrates another embodiment of a light source according to the present invention. Light source 70 is similar to light source 40 shown in FIG. 5, and hence, to simplify the following discussion, those elements of light source 70 that serve functions analogous to those served by elements of light source 40 have been given the same numeric designations and will not be discussed further here. Light source 70 differs from light source 40 in that the white LEDs have been incorporated into one of the color LED arrays. In this embodiment, the white LEDs are constructed from blue LEDs that include a phosphor that converts some of the blue light to yellow light. Hence, the white LEDs have been included in the set of blue LEDs. That is, the LEDs in LED chain 61 are a mixture of white LEDs 62 and blue LEDs 63. The white LEDs are preferably uniformly distributed within chain 61.

This arrangement eliminates the need for a separate current source and intensity control mechanism. Color controller 41 can treat the three sets of LEDs exactly as it did in the embodiment shown in FIG. 5. The user provides the identity of the color point and desired light intensity to light source controller 68 in the form of red, blue, and green target values. The intensity is increased or decreased by increasing or decreasing, respectively, all of the target values while maintaining the relative values of the target values constant.

Various modifications to the present invention will become apparent to those skilled in the art from the foregoing description and accompanying drawings. Accordingly, the present invention is to be limited solely by the scope of the following claims.

What is claimed is:

1. A light source for generating light having a perceived color that can be varied, said light source comprising:
    a plurality of sets of LEDs, said plurality of sets comprising:
        a first monochrome set of LEDs comprising a plurality of monochrome LEDs emitting light of a first color;
        a second monochrome set of LEDs comprising a plurality of monochrome LEDs emitting light of a second color;
        a white set of LEDs comprising a plurality of LEDs emitting white light;
    a mixing device that combines light from said plurality of sets of LEDs to produce a composite light having a perceived color;
    a plurality of current drivers, said plurality of current drivers comprising:
        a first current driver supplying current to said first monochrome set of LEDs;
        a second current driver supplying current to both said second monochrome set of LEDs and said white set of LEDs;
    a controller controlling said plurality of current drivers in response to an input signal from a source external to said light source, said controller maintaining said perceived color at a point determined by said input signal.

2. The light source of claim 1 wherein said LEDs in said second monochrome set of LEDs are connected in series with said LEDs in said white set of LEDs.

3. The light source of claim 2 wherein said controller controls the average current supplied by said second current driver to said LEDs in said second monochrome set of LEDs and said LEDs in said white set of LEDs.

4. The light source of claim 1 wherein said second monochrome set of LEDs emits blue light.

5. The light source of claim 1 wherein said white set of LEDs comprises a plurality of blue LEDs, each including a layer of phosphor that converts some of the light emitted thereby from the blue to the yellow region of the spectrum.

6. The light source of claim 1 and further wherein:
    said plurality of sets of LEDs further comprises a third monochrome set of LEDs comprising a plurality of monochrome LEDs emitting light of a third color; and
    said plurality of current drivers further comprises a third current driver supplying current to said third monochrome set of LEDs.

7. The light source of claim 6 wherein said first color is red, said second color is blue and said third color is green.

8. The light source of claim 1 wherein said LEDs in said first monochrome set of LEDs are arranged in series.

9. The light source of claim 8 wherein said controller controls the average current supplied by said first current driver to said LEDs in said first monochrome set of LEDs.

10. The light source of claim 1 wherein said perceived color is one of a predetermined number of colors, said one of said colors being determined by said input signal.

11. The light source of claim 10 and further comprising a user-operable manual switch having a plurality of positions, each of said plurality of positions corresponding to one of said predetermined number of colors.

12. The light source of claim 1 wherein said mixing device comprises a transparent planar surface that is uniformly illuminated by said composite light.

13. The light source of claim 1 wherein said LEDs in said white set of LEDs is uniformly distributed within said LEDs in said second monochrome set of LEDs.

* * * * *